United States Patent
Nie et al.

(10) Patent No.: US 10,338,813 B2
(45) Date of Patent: Jul. 2, 2019

(54) STORAGE CONTROLLER AND USING METHOD THEREFOR

(71) Applicants: DAWNING CLOUD COMPUTING GROUP CO., LTD, Beijing (CN); DAWNING INFORMATION INDUSTRY (BEIJING) CO., LTD, Beijing (CN)

(72) Inventors: Hua Nie, Beijing (CN); Xiaojun Yang, Beijing (CN); Yalu Ni, Beijing (CN)

(73) Assignees: Dawning Cloud Computing Group Co., Ltd, Beijing (CN); Dawning Information Industry (Beijing) Co., Ltd, Beijing (CN)

( * ) Notice: Subject to any disclaimer, the term of this patent is extended or adjusted under 35 U.S.C. 154(b) by 252 days.

(21) Appl. No.: 15/323,083

(22) PCT Filed: Apr. 22, 2015

(86) PCT No.: PCT/CN2015/077172
§ 371 (c)(1),
(2) Date: Dec. 29, 2016

(87) PCT Pub. No.: WO2016/000478
PCT Pub. Date: Jan. 7, 2016

(65) Prior Publication Data
US 2017/0206013 A1    Jul. 20, 2017

(30) Foreign Application Priority Data
Jun. 30, 2014   (CN) .......................... 2014 1 0304951

(51) Int. Cl.
*G06F 3/06*     (2006.01)
*G06F 13/16*    (2006.01)
*G06F 13/40*    (2006.01)

(52) U.S. Cl.
CPC .......... *G06F 3/0604* (2013.01); *G06F 3/0608* (2013.01); *G06F 3/0631* (2013.01);
(Continued)

(58) Field of Classification Search
CPC .... G06F 3/0604; G06F 3/0608; G06F 3/0631; G06F 3/0658; G06F 3/0661;
(Continued)

(56) References Cited

U.S. PATENT DOCUMENTS 6,275,900 B1 *   8/2001   Liberty ............... G06F 12/0813
                                                          711/120
6,330,611 B1 *  12/2001   Itoh ....................... G06F 3/1203
                                                          358/1.1
(Continued)

FOREIGN PATENT DOCUMENTS

| CN | 201142696 Y | 10/2008 |
| CN | 102063274 A | 5/2011 |
| CN | 104050115 A | 9/2014 |

OTHER PUBLICATIONS

ISA State Intellectual Property Office of the People's Republic of China, International Search Report Issued in Application No. PCT/CN2015/077172, dated Jul. 29, 2015, WIPO, 4 pages.

*Primary Examiner* — Nanci N Wong
(74) *Attorney, Agent, or Firm* — McCoy Russell LLP

(57) ABSTRACT

The present invention provides a storage controller and a using method therefor. The method comprises: processors send a storage instruction; a processor controller receives the storage instructions sent by the processors, and sends the storage instructions to an exchanger; the exchanger sends the storage instructions to a hard disk controller one by one; and the hard disk controller sends the storage instructions to a hard disk according to storage address spaces indicated in the storage instructions, the indicated address spaces being address spaces allocated to the processors sending the storage instructions. By using the technical scheme of the present invention, multiplexing of the same physical storage (Continued)

space for the storage instructions of multiple processors can be ensured in a time-sharing mechanism, and accordingly, a purpose that the multiple processors share the same physical storage space by means of hardware is achieved.

32 Claims, 1 Drawing Sheet

(52) U.S. Cl.
CPC .......... *G06F 3/0661* (2013.01); *G06F 3/0674* (2013.01); *G06F 13/16* (2013.01); *G06F 13/1668* (2013.01); *G06F 13/4068* (2013.01); *G06F 3/0658* (2013.01)

(58) Field of Classification Search
CPC .... G06F 3/0674; G06F 13/16; G06F 13/1668; G06F 13/4068
See application file for complete search history.

(56) References Cited

U.S. PATENT DOCUMENTS

| | | | |
|---|---|---|---|
| 6,385,319 B1* | 5/2002 | Nyu | H04L 25/03866 380/261 |
| 6,763,030 B1* | 7/2004 | Regev | H04L 49/352 370/369 |
| 7,257,655 B1* | 8/2007 | Burney | G06F 13/423 370/408 |
| 7,788,420 B2 | 8/2010 | Maharana et al. | |
| 2005/0240681 A1* | 10/2005 | Fujiwara | H04L 67/1095 710/1 |
| 2006/0274747 A1* | 12/2006 | Duchscher | H04L 1/0057 370/389 |
| 2009/0029650 A1* | 1/2009 | Shon | H04L 1/188 455/68 |
| 2010/0070731 A1* | 3/2010 | Mizuno | G06F 1/3203 711/170 |
| 2010/0202236 A1* | 8/2010 | Kahler | G06F 11/1441 365/228 |
| 2012/0076234 A1* | 3/2012 | Kim | H04L 1/0071 375/295 |
| 2012/0124589 A1* | 5/2012 | Rupley | G06F 9/46 718/103 |
| 2013/0128749 A1* | 5/2013 | Krzanowski | H04L 41/0213 370/241.1 |
| 2015/0268880 A1* | 9/2015 | Asayama | G06F 3/0619 711/114 |

\* cited by examiner

STORAGE CONTROLLER AND USING METHOD THEREFOR

CROSS-REFERENCE TO RELATED APPLICATIONS

The present application is a U.S. National Phase of International Patent Application Serial No. PCT/CN2015/077172, entitled "STORAGE CONTROLLER AND USING METHOD THEREFOR," filed on Apr. 22, 2015. International Patent Application Ser. No. PCT/CN2015/077172 claims priority to Chinese Patent Application No. 201410304951.8, filed on Jun. 30, 2014. The entire contents of each of the above-identified applications are hereby incorporated by reference in their entirety for all purposes.

TECHNICAL FIELD

The present invention is related to a field of computer technology, and more particularly to a storage controller and a using method therefor.

BACKGROUND ART

With the development of cloud computing technology, application models of virtualization technology, as the core technology to support cloud computing, have been converted from original server consolidation virtualization to current desktop virtualization, network virtualization, storage virtualization, etc. The technological value and the application space of the virtualization technology in the field of cloud computing are constantly expanding.

In the prior art, a storage space is logically separated by the means of software to form different logical storage spaces.

A shortcoming in the prior art is that an operating system and the software have to be changed to allocate different address spaces to different processors.

SUMMARY

The present invention provides a storage controller and a using method therefor, and aims to realize multiplexing of the same physical storage space for storage instructions of multiple processors by means of hardware.

The present invention provides a storage controller, comprising: at least one processor controllers, an exchanger and a hard disk controller, wherein each processor controller is configured to connect with a corresponding processor, receive a storage instruction sent by the processor, and send the storage instruction to the exchanger; one end of the exchanger is connected with each processor controller, the other end of the exchanger is connected with the hard disk controller, and the exchanger is configured to send the storage instructions sent by the processor controllers to the hard disk controller one by one, and send response results sent by the hard disk controller to the corresponding processor controllers; and the hard disk controller is configured to connect with a hard disk, receive the storage instructions sent by the exchanger, send the storage instructions to the hard disk, and receive the response results from the hard disk.

The present invention further provides a using method for the storage controller, comprising: receiving storage instructions sent by corresponding processors by processor controllers, and sending the storage instructions to an exchanger by the processor controllers; sending by the exchanger the storage instructions sent by the processor controllers to a dark disk controller one by one; and indicating storage address spaces in the storage instructions by the hard disk controller when the hard disk controller receives the storage instructions sent by the exchanger, and then sending by the hard disk controller the storage instructions to a hard disk, wherein the indicated address spaces are address spaces allocated to the processors sending the storage instructions.

The present invention has the following advantageous effects. In the technical solutions provided by the embodiments of the present invention, the exchanger sends the storage instructions sent by the respective processors to the hard disk controller one by one, and the hard disk controller sends the storage instructions to the hard disk after indicating the storage address spaces in the storage instructions, wherein the indicated address spaces are the address spaces allocated to the processors sending the storage instructions. As the address spaces on a physical storage space are pre-allocated to each processor by the dark disk controller, the corresponding storage instructions are substantially executed in the address spaces dedicated to the processors sending the storage instructions. Moreover, the storage instructions processed by the dark disk controller are sent one by one after the exchanger performs arbitration coordinated control on the storage instructions, so that multiplexing of the same physical storage space for the storage instructions of the multiple processors is ensured in a time-sharing mechanism, and accordingly, a purpose that the multiple processors share the same physical storage space by means of hardware is achieved.

BRIEF DESCRIPTION OF THE DRAWINGS

The particular embodiments of the present invention will be described with reference to the accompanying drawings.

DETAILED DESCRIPTION

In order to illustrate the technical solutions and the advantages of the present invention more clearly, the exemplary embodiments of the present invention will be described in further detail hereinafter with reference to the accompanying drawings. Obviously, the described embodiments are only part of those of the present invention, rather than exhaustive examples of all embodiments.

The inventor noted that in the prior art, if the same physical storage space is to be shared, that is, different address spaces need to be allocated to different processors, usually, a storage space is logically separated by means of software to form different logical storage spaces in the prior art. In such manner, it is required to change an operating system and the software to some extent.

The shortcomings of the technical solution are that the change of the operating system and the software will inevitably cause some problems about compatibility and stability, and post-maintenance and upgrade can be realized with higher labor costs. In the prior art, there is no solution capable of sharing the same physical storage space by means of hardware.

To overcome the above shortcomings, the embodiments of the present invention provide a storage controller and a using method therefor, which will be described hereinafter.

Figure 1:
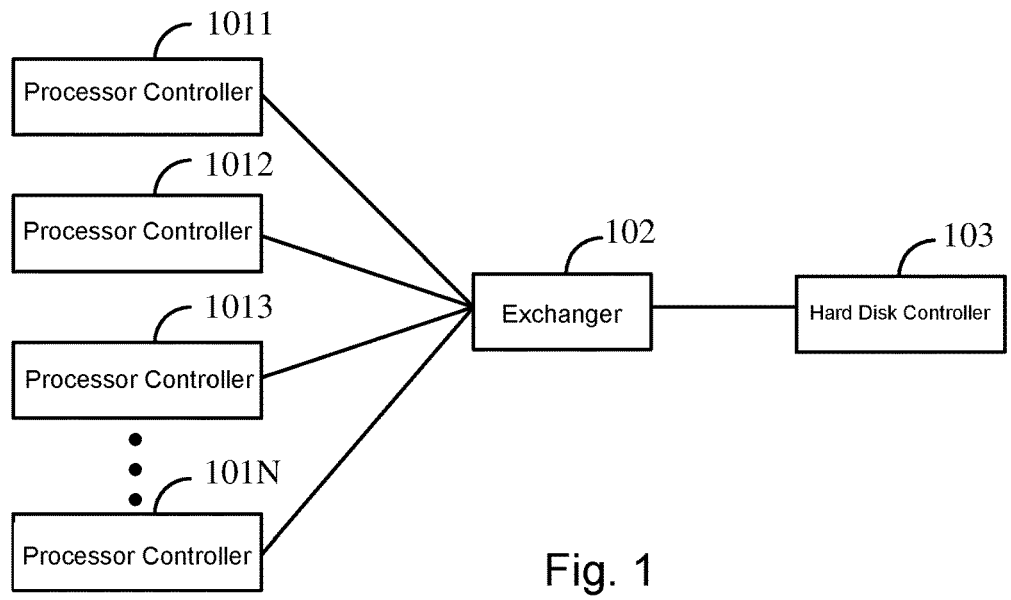
FIG. 1 is a schematic diagram showing an implementation structure of a storage controller according to an embodiment of the present invention.

FIG. 1 is a schematic diagram showing an implementation structure of a storage controller according to an embodiment of the present invention. As shown in FIG. 1, the storage controller may comprise at least one processor controller 1011, an exchanger 102 and a hard disk controller 103.

Each processor controller 1011 is configured to connect with a corresponding processor, receive a storage instruction sent by the processor, and send the storage instruction to the exchanger 102.

One end of the exchanger 102 is connected with each processor controller 1011, the other end of the exchanger is connected with the hard disk controller 103, and the exchanger is configured to send the storage instructions sent by the processor controllers 1011 to the hard disk controller 103 one by one.

The hard disk controller 103 is configured to connect with a hard disk, indicate storage address spaces in the storage instructions when receiving the storage instructions sent by the exchanger 102, and then send the storage instructions to the hard disk, wherein the indicated address spaces are address spaces allocated to the processors sending the storage instructions.

In particular implementation, the hard disk controller 103 may pre-allocate an address space on the physical memory space to each processor, so that the corresponding storage instructions are substantially executed in the address spaces dedicated to the processors sending the storage instructions.

In implementation, the processor controllers 1011 may also be configured to perform serial-parallel conversion, 8b/10b coding conversion and descrambling on the storage instructions when receiving the storage instructions sent by the processors, and then send the storage instructions to the exchanger 102.

In particular implementation, data between the processors and the hard disk are interacted in a serial manner according to a protocol specification. On one hand, the serial data are too high in frequency to process, and on the other hand, through coding and scrambling, the received storage instructions from the processors cannot be processed directly, so that it is required to perform serial-parallel conversion on the received storage instructions to covert the serial data into parallel data, and then 8b/10b coding conversion and descrambling are performed. After that, processable storage instructions are obtained and then are sent to the exchanger 102.

In implementation, the processor controllers 1011 may also be configured to mark the storage instructions sent by the processors.

In particular implementation, the processor controllers 1011 may mark the received storage instructions in a packaging manner, so as to mark the instructions sent by which processors.

In implementation, the hard disk controller 103 may also be configured to determine address spaces of the processors sending the storage instructions according to marks.

In particular implementation, after the marked storage instructions are transferred to the hard disk controller 103, the hard disk controller 103 can know that the storage instructions belong to which processors and correspond to which address spaces.

In implementation, the processor controllers 1011 may also be configured to temporarily store the storage instructions when the hard disk controller 103 is not idle, and send the storage instructions to the exchanger 102 when the hard disk controller 103 is idle.

In particular implementation, the processor controllers 1011 may not immediately send the received storage instructions to the exchanger 102, but may temporarily store them. The effect of temporary storage is to send the storage instructions to the exchanger 102 after the hard disk controller 103 is idle.

In implementation, the hard disk controller 103 may also be configured to indicate a address space of storage in storage instructions by modifying an address field of the storage instruction and mapping the storage instruction onto an address space allocated to the processor.

In implementation, the hard disk controller 103 may also be configured to perform serial-parallel conversion, 8b/10b coding conversion and scrambling on the storage instructions after receiving the storage instructions sent by the exchanger 102, and then send the storage instructions to a hard disk.

In particular implementation, as mentioned earlier, data between the processors and the hard disk are interacted in a serial manner according to the protocol specification, so that the storage instructions can be subjected to serial-parallel conversion to covert parallel data into serial data, and then 8b/10b coding conversion and scrambling are performed. After that, the storage instructions processable by the hard disk are obtained and then are sent to the hard disk.

In implementation, the processor controllers 1011 may also be configured to perform serial-parallel conversion, 8b/10b coding conversion and descrambling on response results after receiving the response results sent by the hard disk, and then send the response results to the exchanger 102.

In particular implementation, data between the processors and the hard disk are interacted in a serial manner according to the protocol specification. On one hand, the serial data are too high in frequency to process, and on the other hand, through coding and scrambling, the received response results from the hard disk cannot be processed directly, so that it is required to perform serial-parallel conversion on the received response results to covert serial data into parallel data, and then 8b/10b coding conversion and descrambling are performed. After that, processable response results can be obtained and then are sent to the exchanger 102.

In implementation, the hard disk controller 103 may also be configured to indicate a responsive address space in one response result by modifying an address field of the response result and reversely mapping the response result onto an address space allocated to the processor.

In particular implementation, the hard disk controller 103 performs address mapping on address fields in the received storage instructions, and then sends the processed storage instructions to the hard disk; the hard disk itself returns the response results to the hard disk controller 103; and the hard disk controller 103 performs address reverse mapping after modifying the address fields in the response results, and then sends the response results to the exchanger 102. Here, the address mapping process and the address reverse mapping process are mutually opposite to each other, and may be completed on the hard disk controller 103.

In implementation, the hard disk controller 103 may also be configured to temporarily store the response results when the processor controllers 1011 are not idle, and send the response results to the exchanger 102 when the processor controllers 1011 are idle.

In implementation, the hard disk controller 103 may also be configured to mark the response results sent from the hard disk; and the exchanger 102 may also be configured to determine the processor controllers 1011 receiving the response results according to marks.

In particular implementation, each processor controller 1011 can mark the storage instruction sent to the exchanger 102 to enable the hard disk controller 103 to know that the instruction is sent by which processor; and according to the mark, the hard disk controller 103 can not only perform address mapping and address reverse mapping, but also send the modified response result to the corresponding processor via the exchanger 102.

In implementation, the processor controllers 1011 may also be configured to perform serial-parallel conversion, 8b/10b coding conversion and scrambling on the response results when receiving the response results sent by the exchanger 102, and then send the response results to the processors.

In implementation, the exchanger 102 may arbitrate the storage instructions according to the storage instructions and a Matrix Arbiter algorithm, and send the storage instructions to the hard disk controller 103 one by one according to arbitration results.

In particular implementation, the exchanger 102 may further comprise an updating unit, a reading unit, a determination unit, a first execution unit, a second execution unit and a third execution unit, wherein the updating unit is configured to update arbitration matrixes in the Matrix Arbiter algorithm; the reading unit is configured to read first frames sent from the processor controllers 1011; the determination unit is configured to determine whether the first frames are PIO Data In instructions, if yes, the storage instructions enter a PIO SetupFIS state after forwarding is completed, or if not, the storage instructions enter a RegFIS state; the first execution unit is configured to wait for a Register FIS-Device to Host frame for the storage instructions in the RegFIS state, and the storage instructions return to an initial state after the frame is received and the receiving is completed; the second execution unit is configured to receive the last frame of the storage instruction in the PIOSetupFIS state, and the storage instructions enter a DataFIS state if BSY and DRQ bits in an E_STATUS field of the last frame are both 0; and the third execution unit is configured to complete reception of the last frame for the storage instructions in the DataFIS state, then return to the initial state, wherein in the process of returning to the initial state, the exchanger starts to receive SATA instructions sent by the plurality of processors to perform next arbitration.

In particular implementation, each storage instruction is arbitrated according to the storage instructions and the Matrix Arbiter algorithm, and sending and response processes of the storage instructions are monitored after arbitration. Thus multiplexing of the same physical storage space for the storage instructions of different processors can be ensured in a time-sharing mechanism, and an unpredictable error caused by the fact that the instructions of the different processors are sent to the same hard disk simultaneously is avoided.

In order to describe conveniently, various parts of the above storage controller are functionally divided into various components or units to be described respectively. Of course, functions of the components or units may be implemented in the same one or a plurality of software or hardware in the implementation of the present invention.

The implementation will be described hereinafter in combination with a particular embodiment.

The hard disk controller 103 pre-allocates an address spaces to each processor on a physical memory space. The storage controller comprises a plurality of processor controllers, and each processor controller is connected with a corresponding processor. When the processor controllers 1011, 1012, 1013, . . . , and 101N receive the storage instructions sent by the corresponding processors, firstly, serial-parallel conversion, 8b/10b coding conversion and descrambling is performed on storage instructions to obtain processable storage instructions; secondly, the storage instructions are marked in a packaging manner to mark the storage instructions sent by which processors; thirdly, if the hard disk controller 103 is not idle, the storage instructions are temporarily stored, and if the hard disk controller 103 is idle, the storage instructions are sent to the exchanger 102; fourthly, the exchanger 102 arbitrates the storage instructions sent by the processor controllers 1011, 1012, 1013, . . . , and 101N according to the storage instructions and the Matrix Arbiter algorithm, and then sends the storage instructions to the hard disk controller 103 one by one according to arbitration results; and finally, the hard disk controller 103 determines address spaces of the processors sending the storage instructions according to marks, indicates storage address spaces in the storage instructions by modifying address fields of the storage instructions to map the storage instructions onto address spaces allocated to the processors, and sends the storage instructions subjected to serial-parallel conversion, 8b/10b coding conversion and scrambling to a hard disk after the storage address spaces are found.

The hard disk will return a response result after receiving one storage instruction. Firstly, the hard disk controller 103 performs serial-parallel conversion, 8b/10b coding conversion and descrambling on the response result when receiving the response result sent from the hard disk to obtain a processable response result; secondly, address reverse mapping is performed after an address filed in the response result is modified, wherein the address mapping process and the address reverse mapping process are mutually opposite to each other; thirdly, the response result sent by the hard disk is marked, the exchanger 102 determines the processor controller 1011 receiving the response result according to a mark; fourthly, the response result is temporarily stored if the processor controller 1011, 1012, 1013, . . . , or 101N is not idle, or the response result is sent to the exchanger 102 if the processor controller 1011, 1012, 1013, . . . , or 101N is idle; and finally, the processor controllers 1011, 1012, 1013, . . . , and 101N perform serial-parallel conversion, 8b/10b coding conversion and scrambling on the response results after receiving the response results sent by the exchanger 102, and then send the response results to the corresponding processors. With this, a complete interaction process is realized.

Based on the same inventive concept, the embodiments of the present invention further provide a using method for the storage controller. As the principle of the using method is similar to that of the storage controller, the implementation of the method may refer to that of the storage controller, which will not be repeated herein.

Figure 2:
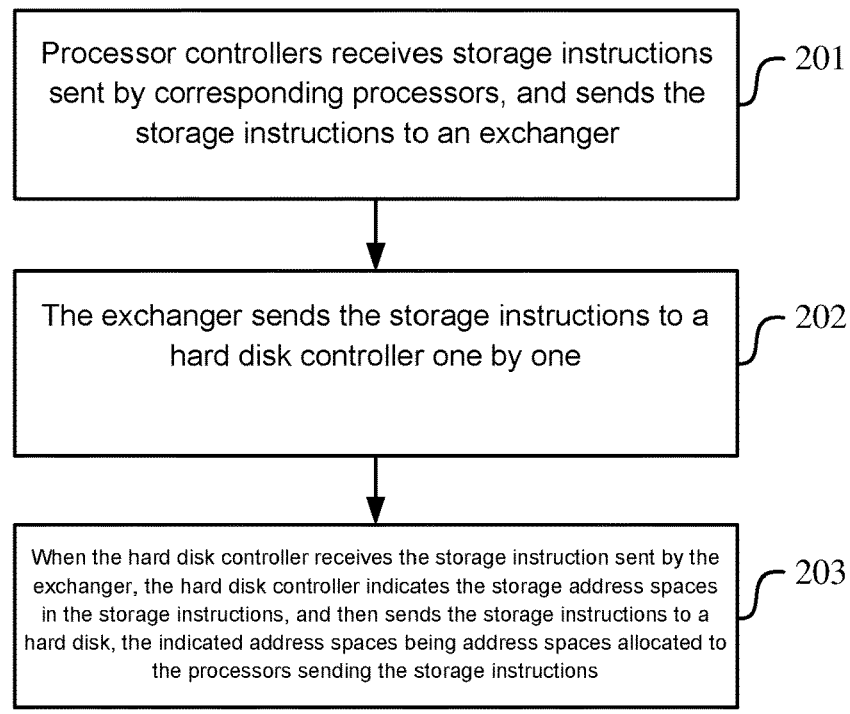
FIG. 2 is a schematic diagram showing a flow of using the storage controller according to another embodiment of the present invention.

FIG. 2 is a schematic diagram showing a flow of using the storage controller according to another embodiment of the present invention. As shown in FIG. 2, the flow may comprise the following steps: in step 201, receiving by processor controllers 1011 storage instructions sent by corresponding processors, and sending by the processor controllers the storage instructions to an exchanger 102; in step 202, sending by the exchanger 102 the storage instructions sent by the processor controllers 1011 to a dark disk controller 103 one by one; and in step 203, indicating by the hard disk controller 103 storage address spaces in the storage instructions when receiving the storage instructions sent by the exchanger 102, and then sending by the hard disk controller 103 the storage instructions to a hard disk, wherein the indicated address spaces are address spaces allocated to the processors sending the storage instructions.

Further, the processor controllers 1011 may perform serial-parallel conversion, 8b/10b coding conversion and descrambling on the storage instructions after receiving the storage instructions sent by the processors, and then send the storage instructions to the exchanger 102.

Further, the processor controllers 1011 may mark the storage instructions sent by the processors after receiving the storage instructions sent by the processors.

The hard disk controller 103 can determine address spaces of processors sending the storage instructions according to marks when receiving response results sent by the hard disk.

Further, when the processor controllers 1011 receives the storage instructions sent by the processors, the processor controllers 1011 may temporarily store the storage instructions when the hard disk controller 103 is not idle and send the storage instructions to the exchanger 102 when the hard disk controller 103 is idle.

Further, when the hard disk controller 103 receives the storage instructions sent by the exchanger 102, the hard disk controller 103 may indicate storage address spaces in the storage instructions by modifying address fields of the storage instructions to map the storage instructions onto address spaces allocated to the processors.

Further, when the hard disk controller 103 receives the storage instructions sent by the exchanger 102, the hard disk controller 103 may perform serial-parallel conversion, 8b/10b coding conversion and scrambling on the storage instructions, and then send the storage instructions to the hard disk.

Further, the hard disk controller 103 may receive response results sent by the hard disk after sending the storage instructions to the hard disk, perform serial-parallel conversion, 8b/10b coding conversion and descrambling on the response results, and then send the response results to the exchanger 102.

Further, the hard disk controller 103 may receive response results sent by the hard disk, the hard disk controller 103 may indicate responsive address spaces in the response results by modifying address fields of the response results to reversely map the response results onto address spaces allocated to the processors.

Further, when the hard disk controller 103 receives the response results sent by the hard disk, the hard disk controller 103 may temporarily store the response results when the processor controllers 1011 are not idle, and send the response results to the exchanger 102 when the processor controllers 1011 are idle.

Further, the hard disk controller 103 may mark the response results sent by the hard disk when receiving the response results sent by the hard disk.

Further, the processor controllers 1011 that receive the response results can be determined according to marks when the processor controllers 1011 receive the response results sent by the exchanger 102.

Further, the processor controllers 1011 may perform serial-parallel conversion, 8b/10b coding conversion and scrambling on the response results after receiving the response results sent by the exchanger 102, and then send the response results to the processors.

Further, the exchanger 102 may arbitrate the storage instructions according to the storage instructions and the Matrix Arbiter algorithm when sending the storage instructions to the hard disk controller 103 one by one, and then send the storage instructions to the hard disk controller 103 one by one according to arbitration results.

Further, after the exchanger 102 arbitrates the storage instructions, the flow may comprise the following steps: updating arbitration matrixes in the Matrix Arbiter algorithm; reading first frames sent from the processor controllers 1011; determining whether the first frames are PIO Data In instructions, if yes, enabling the storage instructions to enter a PIOSetupFIS state after forwarding is completed, or if not, enabling the storage instructions to enter a RegFIS state; waiting a Register FIS-Device to Host frame for the storage instructions in the RegFIS state, and enabling the storage instructions to return to an initial state after the frame is received and the receiving is completed; completing reception of the last frame of the storage instruction in the PIOSetupFIS state, and enabling the storage instructions to enter a DataFIS state if BSY and DRQ bits in an E_STATUS field of the last frame are both 0; and enabling the storage instructions to return to the initial state after receiving the last frame for the storage instructions in the DataFIS state is completed, wherein in the process of returning to the initial state, reception of the SATA instructions sent by a plurality of processors is started, and next arbitration is performed.

In implementation, both the storage instructions and the response results may be in the form of frames.

Further, a serial-parallel conversion and 8b/10b coding conversion on the storage instructions or the response results are performed at a physical layer.

Further, scrambling or descrambling on the storage instructions or the response results are performed at a link layer.

Further, CRC check of the storage instructions is performed at the link layer.

Further, flow control on sending and receiving of the storage instructions is performed at the link layer.

Further, a frame sent from the link layer is received at a transport layer; and the frame header and the frame length are checked, and the link layer is informed if a wrong frame is discarded.

Further, a frame sent from a network layer is received at a transport layer; the frame header and the frame length are checked, and the network layer is informed if the wrong frame is discarded.

Further, a storage instruction sent from the network layer is received at the transport layer; and the storage instruction is mapped onto an address space allocated to the processor according to a storage address space indicated in the instruction.

Further, a response result from the link layer is received at the transport layer; and the response result is mapped onto an address space of a processor corresponding to a hard disk sending the response result according to a mark of the address space.

Further, the storage instruction received by the transport layer is marked at the network layer, and then is sent to the exchanger 102.

Further, the response result sent from the exchanger 102 is received at the network layer, and then is sent to the transport layer.

In the storage controller and the using method therefor provided by the embodiments of the present invention, the hard disk controller physically pre-allocates a storage space to each processor, and the exchanger sequentially sends the storage instructions to the hard disk controller one by one, so that multiplexing of the same physical storage space for the storage instructions of the multiple processors can be ensured in a time-sharing mechanism, and accordingly, a purpose that the multiple processors share the same physical storage space by means of hardware is achieved.

The above embodiments are merely used for illustrating the technical solutions of the present invention, rather than limiting the present invention. Therefore, those skilled in the art may make various modifications, substitutions and variations without departing from the spirit or essence of the present invention. Obviously, these modifications, substitutions and variations shall be embraced in the protective scope of the present invention as claimed in claims.

The invention claimed is:

1. A method for using a storage controller, the method comprising:
    receiving, by processor controllers, storage instructions sent by corresponding processors, and sending, by the processor controllers, the storage instructions to an exchanger;
    sending, by the exchanger, the storage instructions to a hard disk controller one by one; and
    indicating, by the hard disk controller, storage address spaces in the storage instructions when receiving the storage instructions from the exchanger, and then sending, by the hard disk controller, the storage instructions to a hard disk, wherein the indicated address spaces are address spaces allocated to the processors that are sending the storage instructions;
    wherein the exchanger arbitrates the storage instructions according to the storage instructions and a Matrix Arbiter algorithm when sending the storage instructions to the hard disk controller one by one, and then sends the storage instructions to the hard disk controllers one by one according to arbitration results;
    after the exchanger arbitrates the storage instructions, the method further comprises:
        updating arbitration matrixes in the Matrix Arbiter algorithm;
        reading first frames sent from the processor controllers;
        determining whether the first frames are PIO Data In instructions, if yes, enabling the storage instructions to enter a PIOSetupFIS state after forwarding is completed, or if not, enabling the storage instructions to enter a RegFIS state;
        waiting for a Register FIS-Device to Host frame for the storage instructions in the RegFIS state, and enabling the storage instructions to return to an initial state after the frame is received and the receiving is completed;
        completing reception of a last frame of the storage instructions in the PIOSetupFIS state, and enabling the storage instructions to enter a DataFIS state if BSY and DRQ bits in an E STATUS field of the last frame are both 0; and
        enabling the storage instructions to return to the initial state after the last frame receiving for the storage instructions in the DataFIS state is completed, wherein, in the process of returning to the initial state, reception of SATA instructions sent by a plurality of processors is started, and next arbitration is performed.

2. The method of claim 1, wherein the method further comprises: performing serial-parallel conversion, 8b/10b coding conversion and descrambling on the storage instructions when the processor controllers receive the storage instructions sent by the processors, and then sending the storage instructions to the exchanger.

3. The method of claim 1, wherein the method further comprises: marking the storage instructions sent by the processors when the processor controllers receive the storage instructions sent by the processors; and
    determining address spaces of the processors sending the storage instructions according to marks when the hard disk controller receives response results sent by the hard disk.

4. The method of claim 1, wherein the method further comprises: temporarily storing the storage instructions when the hard disk controller is not idle, and sending the storage instructions to the exchanger when the hard disk controller is idle when the processor controllers receive the storage instructions sent by the processors.

5. The method of claim 1, wherein the method further comprises: indicating storage address spaces in the storage instructions by modifying address fields of the storage instructions to map the storage instructions onto the address spaces of the processors, when the hard disk controller receives the storage instructions sent by the exchanger.

6. The method of claim 5, wherein the method further comprises: performing serial-parallel conversion, 8b/10b coding conversion and scrambling on the storage instructions, and sending the storage instructions to the hard disk when the hard disk controller receives the storage instructions sent by the exchanger.

7. The method of claim 1, wherein the method further comprises: receiving response results sent from the hard disk, performing serial-parallel conversion, 8b/10b coding conversion and descrambling on the response results, and sending the response results to the exchanger, after the hard disk controller sends the storage instructions to the hard disk.

8. The method of claim 7, wherein the method further comprises: indicating responsive address spaces in the response results by modifying address fields of the response results and reversely mapping the response results to address spaces allocated to the processors, when the hard disk controller receives the response results sent from the hard disk.

9. The method of claim 7, wherein the method further comprises: temporarily storing the response results when the processor controllers are not idle, and sending the response results to the exchanger when the processor controllers are idle, when the hard disk controller receives the response results sent from the hard disk.

10. The method of claim 7, wherein the method further comprises: marking the response results sent by the hard disk when the hard disk controller receives the response results sent from the hard disk; and
    determining the processor controllers receiving the response results according to marks when the processor controllers receive the response results sent by the exchanger.

11. The method of claim 7, wherein, the method further comprises:
    performing serial-parallel conversion, 8b/10b coding conversion and scrambling on the response results, and sending the response results to the processors, when the processor controllers receive the response results sent by the exchanger.

12. The method of claim 1, wherein a serial-parallel conversion and 8b/10b coding conversion on the storage instructions or response results are performed at a physical layer.

13. The method of claim 1, wherein scrambling or descrambling on the storage instructions or response results is performed at a link layer.

14. The method of claim 13, wherein a CRC check on the storage instructions is performed at the link layer.

15. The method of claim 14, wherein flow control on sending and receiving of the storage instructions is performed at the link layer.

16. The method of claim 1, wherein a frame from the link layer is received at a transport layer; and a frame header and a frame length are checked, and the link layer is informed if a wrong frame is discarded.

17. The method of claim 16, wherein a frame sent from a network layer is received at the transport layer; and the frame header and the frame length are checked, and the network layer is informed if a wrong frame is discarded.

18. The method of claim 17, wherein the storage instructions sent from the network layer are received at the transport layer; and the storage instructions are mapped onto address spaces allocated to the processors according to storage address spaces indicated in the storage instructions.

19. The method of claim 18, wherein response results from the link layer are received at the transport layer; and the response results are mapped onto address spaces of the processors corresponding to the hard disk sending the response results according to marks of the address spaces.

20. The method of claim 18, wherein the storage instructions received by the transport layer are marked at the network layer, and then are sent to the exchanger.

21. The method of claim 20, wherein the response results sent from the exchanger are received at the network layer, and then are sent to the transport layer.

22. A storage controller comprising: at least one processor controller, an exchanger, and a hard disk controller, wherein
each processor controller is configured to connect with a corresponding processor, receive a storage instruction sent by the processor, and send the storage instruction to the exchanger;
one end of the exchanger is connected with each processor controller, the other end of the exchanger is connected with the hard disk controller, and the exchanger is configured to send the storage instructions sent by the processor controllers to the hard disk controller one by one; and
the hard disk controller is configured to connect with a hard disk, indicate storage address spaces in the storage instructions when receiving the storage instructions sent by the exchanger, and then send the storage instructions to the hard disk, the indicated storage address spaces being address spaces allocated to the processors sending the storage instructions,
wherein the exchanger arbitrates the storage instructions according to the storage instructions and a Matrix Arbiter algorithm, and then sends the storage instructions to the hard disk controllers one by one according to arbitration results,
wherein the exchanger further comprises an updating unit, a reading unit, a determination unit, a first execution unit, a second execution unit, and a third execution unit,
the updating unit being configured to update arbitration matrixes in the Matrix Arbiter algorithm;
the reading unit being configured to read first frames sent from the processor controllers;
the determination unit being configured to determine whether the first frames are PIO Data In instructions, if yes, enable the storage instructions to enter a PIOSetupFIS state after forwarding is completed, or if not, enable the storage instructions to enter a RegFIS state;
the first execution unit being configured to wait for a Register FIS-Device to Host frame for the storage instructions in the RegFIS state, and enable the storage instructions to return to an initial state after the frame is received and the receiving is completed;
the second execution unit being configured to receive a last frame of the storage instructions in the PIOSetupFIS state, and enable the storage instructions to enter a DataFIS state if BSY and DRQ bits in an E STATUS field of the last frame are both 0; and
the third execution unit being configured to complete reception of the last frame for the storage instructions in the DataFIS state, and enable the storage instructions to return to the initial state after the last frame receiving is completed, wherein, in the process of returning to the initial state, the exchanger starts to receive SATA instructions sent by the processors to perform a next arbitration.

23. The storage controller of claim 22, wherein the processor controllers are further configured to perform serial-parallel conversion, 8b/10b coding conversion and descrambling on the storage instructions when receiving the storage instructions sent by the processors, and then send the storage instructions to the exchanger.

24. The storage controller of claim 22, wherein the processor controllers are further configured to mark the storage instructions sent by the processors; and
the hard disk controller is further configured to determine address spaces of the processors sending the storage instructions according to marks.

25. The storage controller of claim 22, wherein the processor controllers are further configured to temporarily store the storage instructions when the hard disk controller is not idle, and send the storage instructions to the exchanger when the hard disk controller is idle.

26. The storage controller of claim 22, wherein the hard disk controller is further configured to indicate storage address spaces in storage instructions by modifying address fields of the storage instructions and mapping the storage instructions onto address spaces allocated to the processors.

27. The storage controller of claim 26, wherein the hard disk controller is further configured to perform serial-parallel conversion, 8b/10b coding conversion and scrambling on the storage instructions after receiving the storage instructions sent by the exchanger, and then send the storage instructions to a hard disk.

28. The storage controller of claim 22, wherein the hard disk controller is further configured to perform serial-parallel conversion, 8b/10b coding conversion and descrambling on response results when receiving the response results sent by the hard disk, and then send the response results to the exchanger.

29. The storage controller of claim 28, wherein the hard disk controller is further configured to indicate responsive address spaces in the response results by modifying address fields of the response results and reversely mapping the response results onto address spaces allocated to the processors.

30. The storage controller of claim 22, wherein the hard disk controller is further configured to temporarily store response results when the processor controllers are not idle, and send the response results to the exchanger when the processor controllers are idle.

31. The storage controller of claim 22, wherein the hard disk controller is further configured to mark the response results sent by the hard disk; and the exchanger is further configured to determine the processor controllers receiving the response results according to marks.

32. The storage controller of claim 22, wherein the processor controllers are further configured to perform serial-parallel conversion, 8b/10b coding conversion and scrambling on response results when receiving the response results sent by the exchanger, and then send the response results to the processors.

* * * * *